United States Patent Office 3,014,881
Patented Dec. 26, 1961

3,014,881
COATING COMPOSITIONS
George D. La Barre, Jr., Broomall, Pa., assignor to E. I. du Pont de Nemours and Company, Wilmington, Del., a corporation of Delaware
No Drawing. Filed Sept. 15, 1959, Ser. No. 840,026
16 Claims. (Cl. 260—18)

This invention relates to novel coating compositions of the baking type and more particularly to liquid coating compositions in which the essential organic film-forming material is a mixture, at least ternary in composition, including particular proportions of (a) a carboxyl-containing interpolymer of styrene, methacrylic or acrylic acid, and a lower alkanol ester of acrylic or methacrylic acid, (b) a drying ester varnish having as essential components thereof a resinous epoxy hydroxy polyether and esterified drying oil fatty acid, and (c) a heat-reactive urea-, melamine-, or benzoguanamine-formaldehyde-alkanol condensate or mixtures of such condensates.

The invention is particularly directed to coating compositions which are applied and baked on such household appliances as refrigerators, freezers, washing machines clothes driers and similar equipment fabricated from sheet metal which requires anti-corrosion protection in the environment in which the appliance is ordinarily used. The invention coating compositions appropriately pigmented are especially useful as a metal primer. They are also useful as the entire protective finish as a composite of primer and topcoat or as a topcoat over an ordinary metal primer. Unpigmented, the compositions are useful as metal protective clear finishes.

The new coating compositions of this invention are liquid coating compositions, clear or pigmented, in which the non-volatile organic film-forming material consists essentially of a mixture, at least ternary in composition, which on a 100% by weight basis contains 20%–50%, preferably 25%–45%, of (a) a carboxyl-containing interpolymer, more fully described hereinafter, of a polymerizable monomer mixture which essentially includes a major proportion of styrene, a small effective proportion of at least one polymerizable monocarboxylic acid of the group of methacrylic acid and acrylic acid, and a minor proportion of at least one $C_1$–$C_4$ alkanol ester of such polymerizable acids; 20%–50%, preferably 25%–45%, of (b) a non-volatile drying ester varnish material having as the essential components in 100 parts by weight thereof at least 40 parts, preferably 50–75 parts, of a resinous epoxyhydroxypolyether of a polyhydric phenol the average composition of which contains more than one 1,2-epoxy group and a plurality of hydroxyl groups per molecule, and complementally 60–15 parts, preferably 50–25 parts of at least one $C_{12}$–$C_{22}$ fatty acid including 15 or more parts of at least one $C_{16}$–$C_{22}$ drying fatty acid, i.e. polyunsaturated aliphatic acrylic monocarboxylic acid having two or more double bonds per molecule, the epoxyhydroxypolyether being partially esterified with the fatty acid component; and complementally 10%–40%, preferably 20%–35%, of (c) one or more urea-, melamine-, urea/melamine- or benzoguanamine-formaldehyde-$C_1$–$C_4$ alkanol condensates or mixtures thereof. This mixture of non-volatile organic film-forming materials is compatibly dissolved in a volatile organic liquid including a solvent for said organic film-forming materials. The coating composition may include ordinary proportions of total pigment in the range of 1% to 200% based on the weight of the non-volatile organic film-forming material.

Various well known functional modifiers for coating compositions such as for example grinding aids, curing accelerators, bodying agents, flow control agents, surface active agents, inhibitors, slip agents, waxy materials such as polyethylene and vegetable waxes which provide abrasion resistance, and plasticizers can be present in the composition in their usual effective small proportions.

The interpolymer component (a) of the organic film-forming material is the solution polymerization product of a copolymerizable monomer mixture having the essential monomer components in the following proportions for a total of 100 parts by weight:

| | Useful | Preferred |
|---|---|---|
| Styrene | 50–85 | 60–80 |
| Methacrylic acid and/or acrylic acid | 3–20 | 5–15 |
| $C_1$–$C_4$ alkanol esters of acrylic and/or methacrylic acid | 5–40 | 10–30 |

When the styrene content is significantly less than 50 parts, the resulting interpolymer formulated in the indicated proportions as a coating composition yields a cured coating characterized by hardness, gloss and chemical resistance below the respective levels desired. When the content of styrene significantly exceeds 85 parts, the cured ultimate coating resulting therefrom lacks the desired degree of flexibility for the indicated end-uses. At least 3 parts of the polymerizable carboxylic acid monomer is necessary to provide the interpolymer with a significant proportion of pendant reactive carboxyl substituents for crosslinking in development of an adequate degree of inertness and insolubility in the ultimately cured coating. When the proportion of pendant carboxyl substituents in the interpolymer is equivalently in excess of 20 parts of the carboxylic monomer component, the interpolymer usually introduces viscosity-instability and the interpolymer may gel undesirably during its preparation or storage. Any further advantages which evolve from the presence of a further increased proportion of pendant carboxyl substituents ordinarily do not compensate for the added cost. At least 5 parts of the ester monomer component is required to provide a significant plasticizing contribution. The ester component is also contributory to compatibilizing the interpolymer a in combination with components b and c. When the ester monomer component is in excess of a practical limit of 40 parts, the functional contribution thereof to the interpolymer and thus to the ultimate coating are not advantageously advanced in proportion to the increased cost.

Especially preferred interpolymers evolve from ternary monomer mixtures which in 100 parts by weight have the following composition: 65–75 parts of styrene, 8–12 parts of methacrylic acid and 15–25 parts of one or more acrylic acid esters of $C_1$–$C_4$ alkanols, particularly ethyl acrylate.

The above described interpolymers of the defined copolymerizable monomer mixtures are prepared in general by solution polymerization by heating the monomer mixture in the presence of a volatile liquid aromatic hydrocarbon solvent for the monomer mixture at a temperature of 125–200° C. until substantially all of the respective monomer components are polymerized. The polymerization charge preferably includes a normal amount of a vinyl polymerization initiator or catalyst which is soluble in the charge and is effective in the indicated temperature range. The usual proportion of polymerization initiator is from about 0.1% to about 2% based on the total weight of the polymerizable monomers. Typical useful polymerization initiators include cumene hydroperoxide, ditertiarybutyl peroxide, tertiarybutyl peracetate, benzaldehyde peroxide, 2,2-bis(tertiarybutylperoxy) butane and diazoaminobenzene. The polymerization time can vary from about one-half hour to about eight hours under conditions of practical commercial operation. Monomer conversion is preferably at least 95% by weight complete, the proportion of monomers converted to polymer being analytically determined on the basis of the weight of the dry residue resulting from heating a thin deposit of about a one-quarter gram sample at 105° C. for one hour. The polymerization charge can further include conventional polymerization adjuvants such as activators, chain transfer agents, inhibitors, and surface active agents in their respective usual small effective proportion, but the presence of these adjuvants is not essential.

The respective polymerizable monomers can be the commercial or technical grade and as such they usually contain a storage-stabilizing small effective proportion of polymerization inhibitor. Rectification of the commercial grades of the monomers to remove the inhibitors present is not essential.

The volatile liquid hydrocarbon solvent component of the polymerization charge can be, for example, toluol, xylol, benzol, mixtures having these aromatic hydrocarbons in major proportion in combination with aliphatic hydrocarbons, and petroleum distillate fractions which are dominantly aromatic in composition, these latter are commercially referred to as high solvency petroleum naphthas. Useful grades of these naphthas are characterized by a mixed-aniline point ordinarily no greater than 40° C. at a dilution of 1 volume with 1 volume normal heptane. Particularly preferred hydrocarbon solvents are characterized by a mixed-aniline point no greater than 40° C. at a dilution of 1 volume with 2 volumes of normal heptane, i.e. the aniline point of a mixture of 3 volumes of aniline, 2 volumes of normal heptane and 1 volume of the hydrocarbon solvent as determined by the procedure identified as ASTM-D-1012-51. The boiling range of the hydrocarbon solvent can be from about 80° C. to about 250° C., preferably no greater than 225° C. It is most convenient to use a high-solvency hydrocarbon or aromatic hydrocarbon mixture which refluxes at the desired polymerization temperature in the range of 125-200° C. because the operation can thus be carried out at atmospheric pressure. Hydrocarbon solvents and solvent mixtures having a reflux temperature lower than 125° C. can be used in the polymerization charge when the reaction equipment provides for operating under super-atmospheric pressure.

A reflux temperature in the range of 140°-170° C. is particularly prefered. Temperatures in these ranges are significantly higher than those ordinarily used in the preparation of vinyl interpolymers having utility in coating formulations. Interpolymers prepared by copolymerization at these higher temperatures yield the desired compatibility with the remaining two film-forming components $b$ and $c$ of the ternary composed organic film-forming material in the indicated proportions and yield the desired balance of properties in the ultimate cured coating.

The proportion of the hydrocarbon solvent in the polymerization charge can range practically from 25-400 parts by weight for each 100 parts of the mixture of polymerizable monomers, i.e. the monomer mixture can be approximately 20-80% of the polymerization charge. The preferred proportion of the hydrocarbon solvent present during polymerization is 33 to 150 parts per 100 parts of the mixture of polymerizable monomers, i.e. the monomer mixture preferably constitutes approximately 40%-75% of the polymerization charge. The presence of the hydrocarbon solvent in the polymerization charge permits precise control of the process and provides the polymerization product in a practical and convenient dissolved fluid state which can be easily handled.

Interpolymers prepared by solution polymerization under the aforementioned conditions are characterized by a relative viscosity usually in the range of 1.05 to 1.20, a relative viscosity in the range of 1.07 to 1.15 being particularly preferred. The method for determining the relative viscosity will hereinafter be described in detail. Interpolymers having the indicated range of degree of polymerization are particularly adaptable to the formulation of liquid coating compositions having the pertinent ternary combination of ($a$) the interpolymer, ($b$) the drying ester varnish material and ($c$) the amine-aldehyde-alkanol condensate as the organic film-forming material thereof because they significantly contribute to the desired improvement in the physical and chemical properties of the cured coating, particularly film integrity, toughness and durability. The degree of polymerization of the interpolymer is sufficient that the ternary-composed organic film-forming material in solution in the liquid coating composition provides a practical balance between the nonvolatile (solids) content and the application viscosity for deposition of smooth coatings of desirable thickness by conventional application methods. On the other hand, the degree of polymerization is insufficient to cause either incompatibility between the components of the film-forming ternary, inadequate solubility in economical or common solvents usually found in coating formulations, or other impractical results such as low coating solids at operative application viscosities or package-instability as a result of gelation.

The drying varnish material $b$ of the ternary composed organic film-forming material is prepared by partially esterifying or varnish-cooking a resinous epoxyhydroxypolyether of a polyhydric phenol with either a glyceride drying oil composition including a glyceride of a $C_{16}-C_{22}$ polyunsaturated fatty acid or one or more $C_{12}-C_{22}$ fatty acids per se including one or more $C_{16}-C_{22}$ polyunsaturated acyclic aliphatic monocarboxylic acids having two or more carbon to carbon double bonds per acid molecule. Sufficient fatty acid per se or the fatty acid glyceride is present in the varnish recipe to provide the aforementioned minimum of at least 15 parts of the polyunsaturated fatty acid component per 100 parts by weight of the non-volatile varnish-forming components.

The polyunsaturated fatty acid triesters of glycerol, glyceride drying oils having the triesters in their natural occurring proportions, the drying oil fatty acid mixtures obtained therefrom or mixtures of these unsaturated oils and acids are ordinarily used to provide the $C_{16}-C_{22}$ polyunsaturated fatty acid component for partial esterification of the epoxyhydroxypolyether. For plasticizing variations, the polyunsaturated $C_{16}-C_{22}$ fatty acids or the drying glyceride oils thereof are advantageously supplemented with non-drying glyceride oil of saturated fatty acids, glyceride of mono-olefinic unsaturated fatty acids, or these acids per se. Castor oil, raw or blown, is particularly suitable as a plasticizing supplement. Typical useful glyceride drying oils are: linseed, oiticica, soybean, tung, chinawood, safflower, sunflower, perilla, poppyseed, cottonseed, and tall oil, and tall oil fractionated to remove resin acids. Important unsaturated fatty monocarboxylic acids found in the aforementioned drying oils include linoleic, linolenic, elaeostearic, licanic, and oleic. Dehydrated castor or dehydrated castor oil acids are also useful as a source of the polyunsaturated fatty acid component.

The resinous epoxyhydroxypolyether component is the product of reacting an aliphatic polyfunctional halohydrin, such as epichlorohydrin or glycerol dichlorohydrin, with a polyhydric phenol in the presence of caustic alkali sufficient to neutralize the liberated halogen. The polyhydric phenol is preferably a dihydric polynuclear phenol having the phenol nuclei connected by an aliphatic carbon bridge, such as for example the bis-phenol 4,4′-dihydroxydiphenyl-dimethylmethane, also referred to as diphenylolpropane.

Useful polyether compounds having 1,2-epoxy groups and hydroxyl groups as the sole functional groups, their preparation, and the preparation of drying esters thereof with drying type unsaturated aliphatic monocarboxylic acids are described in detail in U.S. Patent 2,456,408 wherein the epoxyhydroxypolyethers are designated as polymeric polyhydric alcohol derivatives of a polyhydric phenol. Epoxyhydroxypolyether compounds formed by reaction of epichlorohydrin and the aforementioned bisphenol are commercially available under the trademarks "Epon" epoxy resins and "Araldite" ethoxyline resins.

While the molecular weight of useful resinous epoxyhydroxypolyethers can vary substantially, preferred epoxyhydroxypolyethers are characterized by an epoxy equivalent weight not significantly greater than 1500. Thus, a polyether compound having a preferred average of about two epoxy groups per molecule has a molecular weight preferably no greater than 3000. The 1,2-epoxy equivalent of the epoxyhydroxypolyether is defined as that weight of the polyether in grams which contains one gram-equivalent of the 1,2-epoxy group.

Equally important in characterizing the useful epoxyhydroxypolyethers is the esterification equivalent weight which is defined as that weight of the polyether in grams which will esterify one gram molecular weight of a monocarboxylic acid, such as for example about 280 grams of a $C_{18}$ fatty acid. The esterification equivalent includes the contribution of the esterifiable hydroxyl substituents per se and the contribution of the 1,2-epoxy groups of which each has the equivalency of two hydroxyl groups. Preferred epoxyhydroxypolyethers for practicing this invention are characterized by an esterification equivalent weight in the range of 125 to 200.

Polyether compounds resulting from the esterification of diphenylolpropane and epichlorohydrin are considered to have the following empirical formula:

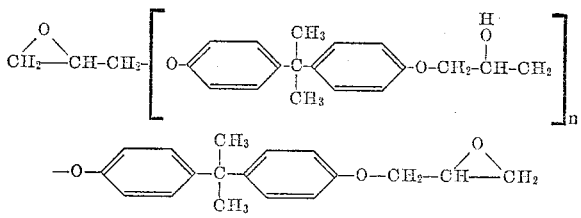

where $n$ is an integer, 0, 1, 2, 3, 4, etc. having a magnitude dependent upon the degree of etherification. It is readily calculated that when $n$ is 1, the molecular weight is of the order of about 625 and the epoxy equivalent is one half this figure. When $n$ is 0, the epoxy polyether represented thereby is the diglycidyl ether having no hydroxyl substituent. It is important that the polyether compound contains esterification equivalency in addition to that provided by the 1,2 epoxy equivalents, i.e. that the polyether compound contains both hydroxyl and 1,2-epoxy equivalents. It is desirable that the average value of $n$ is at least 1. In arriving at the preferred maximum average molecular weight of about 3000, the average value of $n$ is about 10, this average including $n$ values ranging up to 20. Preferably the average value of $n$ is in the range of 2–7. On the basis that these epoxyhydroxypolyethers preferably contain two 1,2-epoxy groups per molecule, it is readily recognized that the ratio of the epoxy equivalent weight to the esterification equivalent weight is in the range of about 3 to 6. For example, "Epon" 1004 epoxyhydroxypolyether resin is characterized by an epoxy equivalent weight of about 945 and an esterification equivalent weight of about 175, the ratio being about 5.4 to 1.

Within the preferred proportions of the recipe for the drying varnish material, 50 parts of a $C_{18}$ monocarboxylic acid having a molecular weight of about 280 provides about 0.1785 carboxyl equivalent and 50 parts of a polyether such as "Epon" 1004, characterized as above, provides a 0.286 of esterification equivalent which includes 0.106 as a contribution thereto by the 0.053 equivalent of 1,2-epoxy group. Thus it is seen that the indicated equivalent of monocarboxylic acid is barely sufficient to esterify the hydroxyl equivalent without the esterification contribution of the epoxy equivalent. Esterification of these epoxy groups reduces the availability thereof for subsequent crosslinking. With a resinous epoxyhydroxypolyether having a relatively lower esterification equivalent it is desirable to use a correspondingly lower proportion of the fatty acid in the reaction of minimize loss of 1,2-epoxy groups through esterification of the fatty acid.

Alternatively the drying ester varnish can be prepared by varnish-cooking a mixture of appropriate proportions of fatty acid glyceride oil, including a polyunsaturated fraction, and the polyether resin at a temperature in the range of 300° F. to 550° F., maintaining a light blow of an inert gas during the heating. Heating is continued for a period sufficient to obtain compatibility and the desired degree of bodying. Thereafter the resulting varnish is thinned with an appropriate solvent. Ordinarily a period of 1 to 2 hours at 500° F. is adequate and at lower temperatures, such as 300° F., heating for 8 hours is practical.

Component $c$ of the organic film-forming material is one or more of the urea-, melamine-, urea/melamine- or benzoguanamine-formaldehyde-$C_1$-$C_4$ alkanol condensates of the type commonly used in organic baking enamels. These condensates are fundamentally prepared in accordance with well known methods by reacting urea, melamine, mixtures thereof, or benzoguanamine with formaldehyde and a $C_1$-$C_4$ alkanol or reacting a methylol-substituted derivative of urea, melamine or benzoguanamine with the $C_1$-$C_4$ alkanol, the proportion of alkanol usually being in excess of the amount required to etherify all of the methylol groups of the formaldehyde condensate. The $C_1$-$C_4$ alkanols are more specifically identified as methanol, ethanol, propanol, butanol, and isobutanol. In addition to the fundamental components of these amine-formaldehyde-alkanol condensates, they may contain minor proportions of amino modifiers such as for example polyamines and arylsulfonamides. Useful condensates of this class are commercially available in solution form under the trade names "Beetle," "Beckamine," "Melmac," "Plaskon," "Resimene" and "Uformite" which are designated as coating resins for baking finishes. These solutions usually have a content of 50–70% by weight of the resinous condensate dissolved in a convenient solvent ordinarily including an aromatic hydrocarbon solvent and an alkanol.

The pigments which are useful in the invention coating compositions are of the class commonly used in the formulation of enamels, paints and lacquers and these are used in the proportions usually specified in such formulations, i.e. in the range of 1% to 200% by weight based on the weight of the non-volatile organic film-forming material. The proportion of pigment preferably is from 45% to 90% in topcoat compositions and 100% to 180% in primer compositions, on the indicated weight basis. Suitable pigments include metal oxides, hydroxides or hydrous oxides, chromates, silicates, sulfates, sulfides and carbonates, carbon black, organic dyestuffs and lakes thereof, and lamellar pigments such as mica and metal flakes like aluminum. These pigments include both prime pigments and pigments generally recognized as extenders. Strongly basic, acid-sensitive, or reactive pigments preferably are avoided because of the presence of reactive carboxyl substituents in the interpolymer component $a$.

Additional volatile organic liquid can supplement the solvent introduced through the solution polymerization of the interpolymer $a$, solvent introduced with the drying varnish $b$ and solvent introduced with the amine-formaldehyde-alkanol condensate $c$. This supplemental volatile organic liquid can be a single solvent, mixtures of solvents or a combination of one or more solvents and one or more non-solvent diluents. Suitable solvents include aromatic hydrocarbons, high solvency petroleum naphthas, alcohols, esters, ketones and ether-alcohols. Aliphatic hydrocarbons can be included to the extent that the organic film-forming mixture remains compatibly in solution. The boiling range of the volatile components is not critical except that it is essential that the volatile components readily evaporate from the applied wet coating during the subsequent baking step and leave a dry finish. Useful solvents and diluents ordinarily have a boiling range within the limits of 80° C. to 275° C. The proportion of this supplemental volatile organic liquid is not critical. At package viscosity, the coating composition may contain as little as 10% by weight of the volatile liquid content and at application viscosity may have as much as 85% of the volatile liquid content, i.e. the total non-volatile content of the liquid coating composition can range practically from 90% to 15% by weight. While the volatile portion of the composition is recognized as being non-aqueous, water may be present in small amount introduced as an ordinary proportion of residual water in the various components.

The invention coating compositions can be applied by spraying, brushing, dipping, roller coating, flow coating or any alternative method ordinarily used in coating metal substrates with an organic coating.

The applied wet coatings are dried and cured to develop the improved properties to the desired degree by heating the applied coating at a temperature in the range of 250° F. to 400° F. This range is not critical, but the heating period at a temperature significantly less than 250° F. is impractically long in comparison with about 60 minutes usually required at this low temperature. Except in the continuous coating of strip material, there is no significant advantage in using a baking temperature higher than 400° F. to shorten the curing period to less than 10–15 minutes usually required at 400° F. Preferred heating conditions which provide optimum results are from 15–20 minutes at 350° F. to 30–40 minutes at 280° F.

The following examples are illustrative of the principles and practice of the invention. However, the scope of the invention is not limited to the specific details of these examples. Throughout the examples and specification the indicated parts and percentages are on a weight basis unless otherwise specifically designated.

EXAMPLE 1

*Primer*

| First portion: | Parts by wt. |
|---|---|
| Titanium dioxide pigment | 13.0 |
| Barytes—low micron size extender pigment | 23.0 |
| Aluminum silicate extender pigment | 4.8 |
| Strontium chromate pigment | .5 |
| Lamy black | .1 |
| Drying Ester Varnish I solution—50% non-volatile in xylol | 5.6 |
| Xylol B.R. 135°–146° C | 4.8 |
| Isopropanol | 1.6 |
| Diacetone alcohol | 0.3 |
| High solvency petroleum naphtha B.R.—170°–263° C., A.P.—28° C | 4.0 |
| Soya lecithin solution—50% in hydrocarbon solvent | 0.3 |
| Creosole inhibitor solution—10% in hydrocarbon solvent | 0.9 |
| Second portion: | |
| Drying Ester Varnish I solution—50% non-volatile in xylol | 11.5 |
| Ternary Interpolymer A solution—55% non-volatile in hydrocarbon solvent | 15.5 |
| Solution of urea-formaldehyde-butanol condensate—60% non-volatile in butanol | 12.4 |
| Third portion: | |
| High solvency petroleum naphtha—BR—170°–263° C., A.P.—28° C | 1.7 |
| | 100.0 |

The primer is prepared by grinding the ingredients of the first portion by the sand grinding process of U.S. Patent 2,581,414 to a smooth uniform pigment dispersion product, mixing therewith the solutions of the organic film-forming materials of the second portion, and finally adjusting the viscosity and non-volatile content with the solvent of the third portion.

The resulting composition has a total non-volatile content (solids) of about 66% by weight including about 24.55% of the organic film-forming materials and about 170% of total pigment based on this content of film-forming material, the latter in 100 parts containing 35 parts of interpolymer *a*, 35 parts of drying ester varnish *b*, and 30 parts of urea-formaldehyde-butanol condensate *c*. The viscosity of the primer composition is 50–55 seconds at 25° C. using No. 10 Parlin cup.

Interpolymer A is the product of solution polymerization of a ternary mixture of monomers which in 100 parts by weight consist of 70 parts of styrene, 10 parts of methacrylic acid and 20 parts of ethyl acrylate. This interpolymer is prepared according to the following recipe.

*Interpolymer A*

| First portion: | Parts by wt. |
|---|---|
| Aromatic hydrocarbon ("Solvesso" 100) BR-150—190° C. A.P.—28° C. or 36–39° C. at dilution of 1 part with 2 parts by volume n-heptane | 430 |
| Second portion: | |
| Styrene, commercial grade monomer | 700 |
| Methacrylic acid, commercial grade monomer | 100 |
| Ethyl acrylate, commercial grade monomer | 200 |
| Ditertiarybutyl peroxide | 10 |
| Third portion: | |
| Xylol, B.R. 135°–146° C. A.P.—44° C. | 230 |
| Butanol | 150 |
| | 1820 |

The first portion is charged into a polymerization vessel equipped with heating means, an agitator, a reflux condenser and temperature controlling means, and heated to reflux temperature of 156°–160° C. The second portion is uniformly premixed at room temperature and the mixture is slowly added to the heated first portion over a period of 3 to 4 hours at a rate such that the polymerization temperature is maintained between 148°–154° C. After the addition of the second portion is complete, the combined first and second portions are held at 150°–160° C. for 90 minutes and then cooled. On cooling to a temperature below the initial boiling point of the solvents of the third portion, the xylol and butanol are added and mixed with the polymerization product. The resulting solution contains about 55% of non-volatile interpolymer and the solution exhibits a Gardner-Holdt viscosity of about Z–1. The ternary interpolymer is characterized by a relative viscosity of 1.089 as determined by the procedure next described.

Relative viscosity is determined first by spreading about 2–3 cc. of interpolymer solution over an area of about 3 square inches in an aluminum foil dish. Interpolymer substantially free of solvent is obtained by heating the thus-prepared sample dish in an oven at about 120° C. for 3 hours. From the resulting dry interpolymer, a solution is made containing 0.500 gram of polymer in 50 ml. of ethylene dichloride. The efflux time of this solution is measured at 25° C. in accordance with ASTM–D–445–53T using the solution as the "oil" in said ASTM determination. A Cannon-Fenske (modified Ostwald) viscosimeter for transparent liquids, series or size number 100, is used in accordance with Appendix A of the determination. The efflux time of a sample of the ethylene dichloride used in making said solution is likewise determined. Relative viscosity $N_r$ of the interpolymer is calculated from the equation:

$$N_r = \frac{\text{efflux time of polymer solution}}{\text{efflux time of ethylene dichloride}}$$

The drying ester varnish I is prepared by charging 300 parts by weight of epoxyhydroxypolyether resin ("Epon"–1004) and 200 parts of oiticica oil into a reaction vessel equipped with controlled heating means and blowing means for inert gas which also serves as an agitation means. The charge is heated to 450° F. in one hour and when the melt temperature reaches about 300° F., the charge is agitated by blowing with an inert gas such as $CO_2$. The varnish-cook is continued at 450° F. to the desired body and is then thinned with about 500 parts of xylol to a non-volatile content of about 50%. The resulting resin solution is characterized by a Gardner-Holdt viscosity of V.

The urea-formaldehyde-butanol condensate is prepared according to the procedure described in U.S. Patent 2,191,957.

The prime pigments and extender pigments are of the quality usually specified in coating compositions. The barytes, being a major pigment extender component, is selected with a small particle size, i.e. less than 13 microns.

The primer composition is mixed 100 volumes with 15–20 volumes of thinner which is an 85:15 mixture of xylol: diacetone alcohol for spray application. Panels of "Bonderized" sheet steel of the type used in refrigerator cabinet fabrication are spray-coated with the thinned composition in an amount sufficient to provide a dry coating of about 0.8 mil (0.6–1.0) thickness. The applied primer is dried and cured by heating the coated panel at an oven temperature of 350° C. for 20 minutes. Another series of the steel panels are spray coated with about 0.8 mil of a comparative commercial primer composition similarly pigmented having as the organic film-forming material thereof a mixture of drying oil/epoxyhydroxypolyether resin varnish and urea-formaldehyde-butanol condensate in the respective proportions of 80:20. This varnish is the ester product of varnish-cooking about 75 parts of epoxyhydroxypolyether resin ("Epon" 1004), 23 parts of fractionated tall oil fatty acids and 2 parts of phthalic anhydride. These coated panels are similarly baked for 20 minutes at 350° F.

The general appearance of the cured primer coating of Example 1 and the comparative primer is equal. However, the invention primer exhibits improved properties over the comparative primer and an overall better balance of properties. Examples of typical improvements are:

|  | Example 1 Primer | Comparative Primer |
|---|---|---|
| Hardness: |  |  |
| Tukon | 26 | 23 |
| Pencil | 3H | 2H |
| Grease Resistance (expressed as pencil hardness): |  |  |
| Initial | 2H | 2H |
| 4 weeks exposure | 2H | F |

In humidity tests of 4 weeks duration and salt spray tests of 1500 hours duration, both primers remain free of deterioration.

Primed steel panels prepared as described above are topcoated with about 1 mil dry coating of a commercial baking enamel of the type used in finishing refrigerator cabinets. The applied topcoat is cured by baking at 350° F. for 20 minutes. This topcoat enamel is more specifically identified as having as the organic film-forming material thereof a mixture of drying oil modified alkyd resin, plasticizing non-drying oil modified alkyd resin, urea-formaldehyde-butanol condensate and melamine-formaldehyde-methanol condensate in the proportion of 60 parts alkyd resin: 30 parts urea-condensate: 10 parts melamine condensate, the pigmentation being 80 parts by weight of titanium dioxide per 100 parts of the organic film-forming material.

The cured topcoat is strongly adherent to the respective primers. The composite finish of the topcoat over the Example 1 primer exhibits an advantageous improvement over the composite of topcoat and comparative primer. For example, the Tukon hardness is 14 versus 12 for the comparative finish and in the grease-resistance test of 4 weeks duration, the decrease in pencil hardness is from 2H to B versus 2H to 2B for the comparative composite finish.

EXAMPLE 2

*Topcoat enamel*

| | Parts by wt. |
|---|---|
| First portion: | |
| Titanium dioxide pigment | 270 |
| Methyl isobutyl ketone | 90 |
| Interpolymer A solution—55% non-volatile | 125 |
| Second portion: | |
| Interpolymer A solution as above | 188 |
| Drying Ester Varnish I solution—50% non-volatile | 138 |
| Urea-formaldehyde-butanol condensate—60% in butanol | 137 |
| Melamine-formaldehyde-methanol condensate—60% in 7:1 toluol:butanol | 35 |
| Butanol | 17 |
| | 1000 |

The organic film-forming materials in this coating composition are in the proportions of:

| | Parts |
|---|---|
| (a) Interpolymer A | 50 |
| (b) Drying Ester Varnish I | 20 |
| (c) 80 urea-formaldehyde-butanol condensate 20 melamine-formaldehyde-methanol condensate | 30 |

The titanium dioxide pigment is present in the proportion of 78 parts for each 100 parts by weight of the organic film-forming material.

The total non-volatile content of this coating composition is 61.5%. This product is particularly suitable as a topcoat superimposed on a coat of Example 1 primer.

The Example 2 composition is mixed 100 volumes with 15–20 volumes of a solvent mixture of 70 parts of high solvency petroleum naphtha or xylol, 20 parts butanol, and 10 parts diacetone alcohol for spray application. This thinned composition is applied to steel panels respectively pre-primed as described with Example 1 primer and with the comparative primer. A sufficient amount of Example 2 coating is applied to provide about 1 mil dry thickness of topcoat. The topcoat is dried and cured by heating the coated panel at an oven temperature of 300° F. for 30 minutes.

In another test, an unprimed steel panel is coated with the thinned primer composition of Example 1 in amount sufficient to provide about 0.5 mil dry coating thickness, the applied primer is allowed to flash-dry for 5 minutes at room temperature and then the thinned topcoat composition of Example 2 is sprayed over the uncured primer in amount sufficient to provide about 1.2 mils dry thickness of topcoat. The composite coating is cured by heating the coated panel at an oven temperature of 300° F. for 30 minutes.

The resulting cured composite finishes are equivalent in general appearance to the composite finishes prepared in Example 1. The composite finishes representing the topcoat composition of Example 2 superimposed on the primer composition of Example 1 exhibit desirable improvements over the comparative composite finishes. The new composite finish exhibits advantageous improvements in hardness, abrasion resistance, and resistance to deterioration from grease, fumes, food, food extracts, heat as found in the environment of the kitchen and resistance to deterioration from alkaline soaps and detergents and other chemicals as found in the environment of the home laundry. The new composite finishes are equal to the respective prior art composite finishes having the comparative topcoat over the comparative primer in flexibility, impact resistance, and anti-corrosion properties as represented by salt-spray and high temperature/high humidity tests.

EXAMPLE 3

The formulation of Example 1 is repeated except that Interpolymer B solution is substituted directly for Interpolymer A solution. Interpolymer B is the solution polymerization product of a ternary monomer mixture consisting of styrene, methacrylic acid and butyl acrylate in the respective proportions of 70:10:20. The polymerization is carried out by the same procedure as described for the preparation of Interpolymer A. The resulting interpolymer solution has a non-volatile content of 55% by weight. Interpolymer B is characterized by a relative viscosity of 1.10.

Although Interpolymer B is slightly softer than Interpolymer A, the respective cured ternary mixtures of the organic film-forming materials as represented by the proportions in the compositions of Examples 1 and 3 are equivalent in physical and chemical properties. The performance of the primer product of Example 3 is identical with that of Example 1.

EXAMPLE 4

The formulation of Example 1 is repeated except that Interpolymer C solution is substituted directly for Interpolymer A solution. Interpolymer C is the solution polymerization product of a ternary monomer mixture consisting of styrene, acrylic acid and ethyl acrylate in the respective proportions of 70:10:20. The polymerization is carried out by the same procedure as described for the preparation of Interpolymer A with the product having a non-volatile content of 55%. Interpolymer C is characterized by a relative viscosity of 1.115.

Although Interpolymer C contains a slightly greater number of pendant carboxyl group than Interpolymer A, the respective cured ternary mixtures of the organic film-forming materials as represented by the proportions in Examples 1 and 4 are equivalent in physical and chemical properties. The performance of the primer product of Example 4 is identical with that of Example 1.

EXAMPLES 5, 6 AND 7

The primer formulation of Example 1 is repeated except that Drying Ester Varnishes II, III and IV are respectively substituted for Varnish I on an equal solids basis, the remaining components of the formulation being the same. These varnishes are prepared as follows:

*Drying Ester Varnish II*

Parts by wt.
First portion:
   Epoxyhydroxypolyether resin ("Epon" 1004) __ 302
   Dehydrated Castor oil fatty acids _____ 203

Second portion: Aromatic hydrocarbon solvent
   ("Solvesso" 100) _____ 328
                                        833

The first portion is mixed and heated to 380° F. under a blanket of inert gas, then heated to 500° F. with a mild $CO_2$ gas blow of about 3 cubic feet per minute for a 300 gallon batch, held at this temperature to acid number 5 and a viscosity of Gardner-Holdt $Z_3$–$Z_4$ at 60% non-volatile content in the aromatic solvent and then appropriately thinned by addition of the second portion.

*Drying Ester Varnish III*

Parts by wt.
First portion:
   Epoxyhydroxypolyether resin ("Epon" 1004) __ 302
   Linseed oil fatty acids _____ 203
Second portion: Aromatic hydrocarbon solvent
   ("Solvesso" 100) _____ 328
                                        833

Varnish cooking is as in the preparation of Varnish II, heating is at 500° F. to acid number 4 and viscosity of about Z–2 at 60% non-volatile content.

*Drying Ester Varnish IV*

Parts by wt.
First portion:
   Epoxyhydroxypolyether resin ("Epon" 1004) __ 163
   Fractionated tall oil fatty acids _____ 93
Second portion: Epoxyhydroxypolyether resin
   ("Epon" 1004) _____ 150
Third portion: Phthalic anhydride _____ 10
Fourth portion: Xylol _____ 403
Fifth portion: Isopropanol _____ 21
                                        840

The first portion is mixed and heated to 300° F. under an inert gas blanket, then the second portion is added to the first portion melt while the temperature is raised from 300° F. to 325° F. Combined first and second portions are slowly heated to 500° with a mild $CO_2$ gas blow and held for one hour. The third portion is sprinkled into the varnish charge and heating is continued at 500° F. to acid number 1–2 and viscosity Gardner-Holdt of $Z_2$–$Z_4$ at 50% non-volatile content in xylol. The varnish is thinned with xylol as the varnish is cooled and finally the isopropanol is added when the temperature of the charge is below the boiling point of this alkanol.

The respective cured ternary mixtures of organic film-forming materials containing these respective varnishes exhibit only slight differences in physical properties and the performance of the respective primers is equal to that of the primer of Example 1.

EXAMPLE 8

Parts by wt.
First portion:
   Titanium dioxide pigment _____ 295
   Butanol _____ 36
   Diacetone alcohol _____ 23
   Aromatic hydrocarbon solvent ("Solvesso"
     100) _____ 39
   Interpolymer C solution—55% non-volatile __ 95
Second portion:
   Interpolymer C solution—55% non-volatile __ 142
   Drying Ester Varnish V solution—60% non-
     volatile _____ 110
   Benzoguanamine - formaldehyde - butanol con-
     densate—66% non-volatile in butanol ____ 175
   Blown castor oil, pale _____ 16
   Flow control agent—1% polydimethylsiloxane
     in xylol _____ 2
   Xylol BR—135°–146° C. _____ 67
                                        1000

Interpolymer C solution is prepared like Interpolymer A solution except that xylol in the third portion is replaced with the same aromatic hydrocarbon as used in the first portion. Varnish V solution is prepared the same as Varnish II solution except substituting soya oil acids for the dehydrated castor oil acids.

The resulting coating composition is particularly useful as a topcoat finish for refrigerator cabinets and can be used as self-priming on the metal, i.e. the composition can be used both as a primer and a topcoat. The organic film-forming materials of this coating composition contains the following components on a weight basis:

| | Parts by wt. |
|---|---|
| (a) Interpolymer C | 40 |
| (b) Drying Varnish V | 20 |
| Blown castor oil | 5 |
| (c) Benzoguanamine-formaldehyde-butanol condensate | 35 |
| | 100 |

The plasticizing blown castor oil which supplements the drying varnish provides an improvement in flexibility of the cured coating.

Replacement of the blown castor and Drying Varnish V in the Example 8 formula with a plasticized drying varnish resulting from addition of a corresponding proportion of raw castor oil to the recipe for Drying Ester Varnish V and processing as described therefor provides an equivalent coating composition.

EXAMPLE 9

| | Parts by wt. |
|---|---|
| Interpolymer D solution—60% non-volatile | 417 |
| Drying Ester Varnish V solution—60% non-volatile | 167 |
| Urea-formaldehyde-butanol condensate—60% in butanol | 250 |
| Xylol | 136 |
| Butanol | 30 |
| | 1000 |

Interpolymer D is prepared by solution polymerization of styrene, methacrylic acid and ethyl acrylate in the proportions of 55:10:35 according to the following recipe.

Interpolymer D

| | Parts by wt. |
|---|---|
| First portion: Aromatic hydrocarbon B.R. 189°–219° C., A.P.—28° C. or 34–40° C. at dilution of 1 volume with 2 volumes of n-heptane ("Solvesso" 150) | 420 |
| Second portion: | |
| Styrene—commercial monomer | 550 |
| Methacrylic acid commercial monomer | 100 |
| Ethyl acrylate commercial monomer | 350 |
| Benzaldehyde peroxide | 10 |
| Third portion: Xylol | 240 |
| | 1670 |

The first portion is charged into a polymerization vessel and heated to 190° C. The second portion components are pre-mixed at room temperature and introduced into the preheated hydrocarbon in a thin stream over a period of 4 hours at a rate such that the reaction temperature gradually decreases to the range of 150°–160° C. The polymerization charge is held at this temperature range for about 90 minutes after complete addition of the second portion. Thereafter heating is discontinued, the charge is cooled to a temperature below the reflux temperature of the third portion solvent, and the third portion xylol is mixed in. The resulting interpolymer solution contains about 60% non-volatile content. Interpolymer D is characterized by a relative viscosity of about 1.16.

The resulting clear coating composition is thinned with a mixture of xylol and butanol to a consistency suitable for application by dipping and applied to clean polished chrome plate, nickel, brass, copper and aluminum. The applied coating is cured by heating the coated articles for about 30 minutes at about 280° F. The resulting cured coatings are clear, smooth, glossy and adherent to the metal substrate and they are resistant to deterioration when exposed to grease, kitchen fume, food and food extracts, soap, heat, moisture, and other environmental conditions to which metal hardware and trim of electrical appliances are usually subjected.

EXAMPLE 10

| | Parts by wt. |
|---|---|
| Interpolymer E solution—60% non-volatile | 417 |
| Drying Ester Varnish V solution—60% non-volatile | 167 |
| Urea-formaldehyde-butanol condensate — 60% in butanol | 150 |
| Melamine-formaldehyde-methanol condensate, 60% in 7:1 toluol:butanol | 100 |
| Xylol | 106 |
| Butanol | 30 |
| Diacetone alcohol | 30 |
| | 1000 |

Interpolymer E solution is prepared by solution polymerization of styrene, methacrylic acid, butyl methacrylate and isobutyl methacrylate in the respective proportions of 55:10:17.5:17.5 by substituting an equal mixture of butyl methacrylate and isobutyl methacrylate for ethyl acrylate in the recipe for Interpolymer D. The polymerization is carried out under the condition described for the preparation of Interpolymer D, the resulting polymerization product having a non-volatile content of about 60%.

The resulting clear coating composition of Example 10 is thinned to dipping consistency with 80 xylol/20 butanol mixture, applied to polished metal and cured by heating at 280° F. for 30 minutes as described in Example 9. The physical properties and performance of the cured clear coating are substantially equal to those of the cured coating of Example 9.

The clear coating formulations described above, i.e. Examples 9 and 10, are not limited to utility as a clear finish. They can be used as coating intermediates for supplying the organic film-forming material in the formulation of tinted transparent finishes or opaque pigmented compositions useful as primers and topcoats.

Clear coating compositions can be prepared from any of the defined combinations of organic film-forming materials including the pertinent components (a) the interpolymer, (b) the drying varnish and (c) the amine-formaldehyde-$C_1$-$C_4$ alkanol condensate in the indicated proportions. Where optimum resistance to discoloration or yellowing is desired in the cured finish, the drying ester varnish contribution should be minimized and the fatty carboxylic acid component thereof selected from drying fatty acids of recognized resistance to yellowing, such as for example soya oil acids.

The foregoing examples are for the purpose of clearly illustrating the invention and no unnecessary limitations of the invention are to be interpreted therefrom. The invention is not intended to be limited except as defined in the appended claims.

I claim:

1. A liquid coating composition comprising, as the essential organic film-forming material, a compatible mixture of (a) 20%–50% by weight a carboxyl-containing interpolymer of a monomer mixture consisting essentially of a major proportion of styrene, an effective small proportion of a polymerizable mono-carboxylic acid of the group of methacrylic acid, acrylic acid and mixtures thereof, and a minor proportion of at least one ester of said polymerizable acids and a $C_1$-$C_4$ alkanol, (b) 20%–50% of a drying fatty acid ester varnish which in 100 parts by weight of ester-forming reactants thereof consists essentially of at least 40 parts of resinous epoxy-hydroxypolyether and 15 to 60 parts of drying fatty acid material of the class consisting of $C_{12}$-$C_{22}$ fatty acids, glyceride esters of $C_{12}$-$C_{22}$ fatty acids and mixtures thereof, including equivalently at least 15 parts of at least one $C_{16}$-$C_{22}$ polyunsaturated fatty acid, said resinous epoxyhydroxypolyether being partially esterified with at least one said fatty acid, and complementally (c) 10%–40% of a member of the class consisting of urea-formaldehyde-$C_1$-$C_4$ alkanol condensates, urea/melamine-formaldehyde-$C_1$-$C_4$ alkanol condensates, melamineformaldehyde-$C_1$–$C_4$ alkanol condensates, benzoguanamine-formaldehyde-$C_1$–$C_4$ alkanol condensates, and mixtures thereof, said organic film-forming material being in solution in a volatile organic liquid including at least one solvent for said organic film-forming components, said carboxyl-containing interpolymer being the polymer product of solution polymerization of said monomer mixture in the presence of a volatile liquid aromatic hydrocarbon as a solvent for said monomers and the interpolymer thereof.

2. A liquid coating composition comprising, as the essential organic film-forming material, a compatible mixture, at least ternary in composition, of (a) 20%–50% by weight of an interpolymer of a mixture of copolymerizable monomers which in 100 parts by weight consists of 50–85 parts of styrene, 3–20 parts of a polymerizable monocarboxylic acid selected from the group consisting of methacrylic acid, acrylic acid and mixtures thereof, and 5–40 parts of at least one $C_1$–$C_4$ alkanol ester of at least one said polymerizable monocarboxylic acid, (b) 20%–50% of a non-volatile drying fatty acid ester varnish product of an ester-forming reaction mixture consisting essentially, per 100 parts by weight, of 40–85 parts of a resinous epoxyhydroxypolyether characterized as having a plurality of hydroxyl groups, an average of more than one 1,2-epoxy group per molecule, an esterification equivalent weight of 125 to 200 and as being free of reactive groups other than said 1,2-epoxy groups and said hydroxyl groups, and complementally 60 to 15 parts of drying fatty acid material of the class of $C_{12}$–$C_{22}$ fatty acids, glyceride oils of said fatty acids and mixtures thereof, including equivalently at least 15 parts of at least one $C_{16}$–$C_{22}$ polyunsaturated fatty acid, and complementally 10%–40% of (c) a member of the class consisting of urea-formaldehyde-$C_1$–$C_4$ alkanol condensates, melamine-formaldehyde-$C_1$–$C_4$ alkanol condensates, urea-melamine-formaldehyde-$C_1$–$C_4$ alkanol condensates, benzoguanamine-formaldehyde-$C_1$–$C_4$ alkanol condensates and mixtures thereof; said organic film-forming materials being in solution in a volatile organic liquid including essentially at least one solvent for said organic film-forming materials, said carboxyl-containing interploymer being the polymer product of solution polymerization of said monomer mixture in the presence of a volatile liquid aromatic hydrocarbon as a solvent for said monomers and the interpolymer thereof.

3. A coating composition of claim 2 further containing pigment in an amount of 1% to 200% based on the weight of said organic film-forming material.

4. A coating composition of claim 2 in which said components a, b, and c of said organic film-forming mixture are present therein in the following proportions by weight:

| | Percent |
|---|---|
| (a) interpolymer | 25–45 |
| (b) drying ester varnish | 25–45 |
| (c) amine-formaldehyde-$C_1$–$C_4$ alkanol condensate | 10–35 |

5. A coating composition of claim 2 in which said organic film-forming component interpolymer a is the polymerization product of a copolymerizable monomer mixture consisting of 60–80 parts of styrene, 5–15 parts of at least one said polymerizable monocarboxylic acid, and 10–30 parts of said $C_1$–$C_4$ alkanol ester of at least one said polymerizable monocarboxylic acid for a total of 100 parts by weight, said interpolymer being characterized by a relative viscosity in the range of 1.05 to 1.20 at 25° C. at a concentration of 0.5 gram in solution in 50 ml. of ethylene dichloride.

6. A coating composition of claim 5 having as said interploymer component a the polymerization product of said monomer mixture composed of styrene, methacrylic acid and at least one acrylic acid ester of a $C_1$–$C_4$ alkanol.

7. A coating composition of claim 6 having as said interploymer component a the polymerization product of said monomer mixture which in 100 parts by weight consists of 65–75 parts styrene, 8–12 parts methacrylic acid and 15–25 parts ethyl acrylate.

8. A coating composition of claim 2 in which said drying ester varnish b is the ester product of said resinous epoxyhydroxypolyether further characterized as the reaction product of a dihydric phenol and a halohydrin having an 1,2-epoxy equivalent weight no greater than 1500 and said $C_{12}$–$C_{22}$ fatty acid.

9. A coating composition of claim 8 in which said resinous epoxyhydroxypolyether component of said drying ester varnish b is the reaction product of a glycerol halohydrin and diphenylolpropane.

10. A coating composition of claim 8 in which said drying fatty acid ester varnish b consists essentially of the ester product of said resinous epoxyhydroxy polyether and the glycerol triesters of said $C_{12}$–$C_{22}$ fatty acids.

11. A coating composition of claim 9 in which said drying ester varnish b is the product of varnish-cooking 50–75 parts of said resinous epoxyhydroxypolyether and correspondingly 50–25 parts of said $C_{12}$–$C_{22}$ fatty acid component for a total of 100 parts by weight of said varnish-forming components, said fatty acid component including at least 25 parts of said $C_{16}$–$C_{22}$ polyunsaturated fatty acid.

12. As an article of manufacture, a metal substrate having on the surface thereof at least one dry cured coat of the coating composition of claim 1 applied thereto, said applied coating being cured by heating at a temperature in the range of 250° F.–400° F.

13. As an article of manufacture, a sheet steel substrate having on at least one surface thereof a dry cured composite finish including a cured coat of heat-convertible primer coating applied directly to said metal substrate and at least one cured coat of heat-convertible topcoat composition superimposed on said cured primer coat, curing of said primer composition and said topcoat composition being by heating at a temperature in the range of 250° F.–400° F., said applied primer composition consisting essentially of organic film-forming material as defined by claim 1, pigment composed of prime pigment and extender pigment in an amount of 100% to 180% based on the weight of said organic film-forming material, and a volatile organic solvent for said organic film-forming material.

14. An article as in claim 13 having present in said applied heat-convertible topcoat composition organic film-forming material as defined by claim 1, pigment composed mainly of prime white pigment in an amount of 45% to 90% based on the weight of said organic film-forming material, and a volatile organic solvent for said organic film-forming material.

15. An article as in claim 13 wherein said applied heat-convertible primer composition has as essential components thereof organic film-forming material consisting essentially of (a) 25%–45% by weight of an interpolymer of a copolymerizable mixture which in 100 parts by weight consists of 60–80 parts of styrene, 5–15 parts of methacrylic acid and 10–30 parts of an acrylic acid ester of a $C_1$–$C_4$ alkanol, (b) 25%–45% by weight of a drying ester varnish having as the ester-forming components thereof 40–85 parts of a resinous epoxyhydroxypolyether product of a glycerol-halohydrin and diphenylolpropane having a 1,2-epoxy equivalent weight no greater than 1500 and an esterification equivalent weight of 125–200, and correspondingly for a total of 100 parts by weight, 60–15 parts of at least one $C_{12}$–$C_{22}$ fatty acid including therein at least 15 parts of $C_{16}$–$C_{22}$ polyunsaturated fatty acid, and (c) 20%–35% of urea-formaldehyde-$C_1$–$C_4$ alkanol condensate, said organic film-forming components being in solution in a volatile organic liquid including a solvent for said organic film-forming components; and pigment, including titanium dioxide as prime pigment and white extender pigments of small particle size, in an amount of 100% to 180% based on the weight of said organic film-forming material, said interpolymer being further characterized by a relative viscosity of 1.05 to 1.20 at 25° C. based on a solution of 0.5 gram of said interpolymer in 50 ml. of ethylene dichloride.

16. A coating composition of claim 1, having utility as a baking primer on sheet steel, comprising, as the essential organic film-forming material, (a) 25%–45% by weight of an interpolymer of a copolymerizable mixture which in 100 parts by weight consists of 60–80 parts of styrene, 5–15 parts of methacrylic acid and 10–30 parts of at least one ester of acrylic acid and a $C_1$–$C_4$ alkanol, (b) 25%–45% by weight of a drying ester varnish having as the ester-forming components thereof 50–75 parts of a resinous epoxyhydroxypolyether product of a glycerol halohydrin and diphenylolpropane having a 1,2-epoxy equivalent weight no greater than 1500 and an esterification equivalent weight of 125–200, and correspondingly for a total of 100 parts by weight, 50–25 parts of at least one $C_{12}$–$C_{22}$ fatty acid including therein at least 25 parts of $C_{16}$–$C_{22}$ polyunsaturated fatty acid, and (c) 20%–35% of a member of the group of urea-formaldehyde-$C_1$–$C_4$ alkanol, urea-melamine-formaldehyde-$C_1$–$C_4$ alkanol, melamine-formaldehyde-$C_1$–$C_4$ alkanol, benzoguanamine-formaldehyde-$C_1$–$C_4$ alkanol and mixtures thereof; said organic film-forming material being in solution in a volatile organic liquid including at least one solvent for said organic film-forming components; and pigment, including hiding prime pigment and extender pigment of small particle size, in an amount of 100% to 180% based on the weight of said organic film-forming material, said carboxyl-containing interpolymer being the polymer product of solution polymerization of said monomer mixture in the presence of a volatile liquid aromatic hydrocarbon as a solvent for said monomers and the interpolymer thereof and being characterized by a relative viscosity of 1.05 to 1.20 at 25° C. based on a solution of 0.5 gram of said interpolymer in 50 ml. of ethylene dichloride.

References Cited in the file of this patent
UNITED STATES PATENTS

| | | |
|---|---|---|
| 2,703,765 | Osdal | Mar. 8, 1955 |
| 2,866,057 | Peck | Dec. 23, 1958 |
| 2,918,391 | Hornibrook | Dec. 22, 1959 |